Nov. 27, 1962 W. H. BERCH 3,066,194

ALARM SIGNAL MEANS

Filed July 30, 1957 2 Sheets-Sheet 1

INVENTOR.
WILLIAM H. BERCH

BY George J. Seligsohn

ATTORNEY

Nov. 27, 1962 W. H. BERCH 3,066,194
ALARM SIGNAL MEANS
Filed July 30, 1957 2 Sheets-Sheet 2

INVENTOR.
WILLIAM H. BERCH
BY George J. Seligsohn
ATTORNEY 3,066,194
Patented Nov. 27, 1962

1

3,066,194

ALARM SIGNAL MEANS

William H. Berch, Penfield, N.Y., assignor to General Dynamics Corporation, Rochester, N.Y., a corporation of Delaware Filed July 30, 1957, Ser. No. 675,130
4 Claims. (Cl. 179—27)

Figure 1:
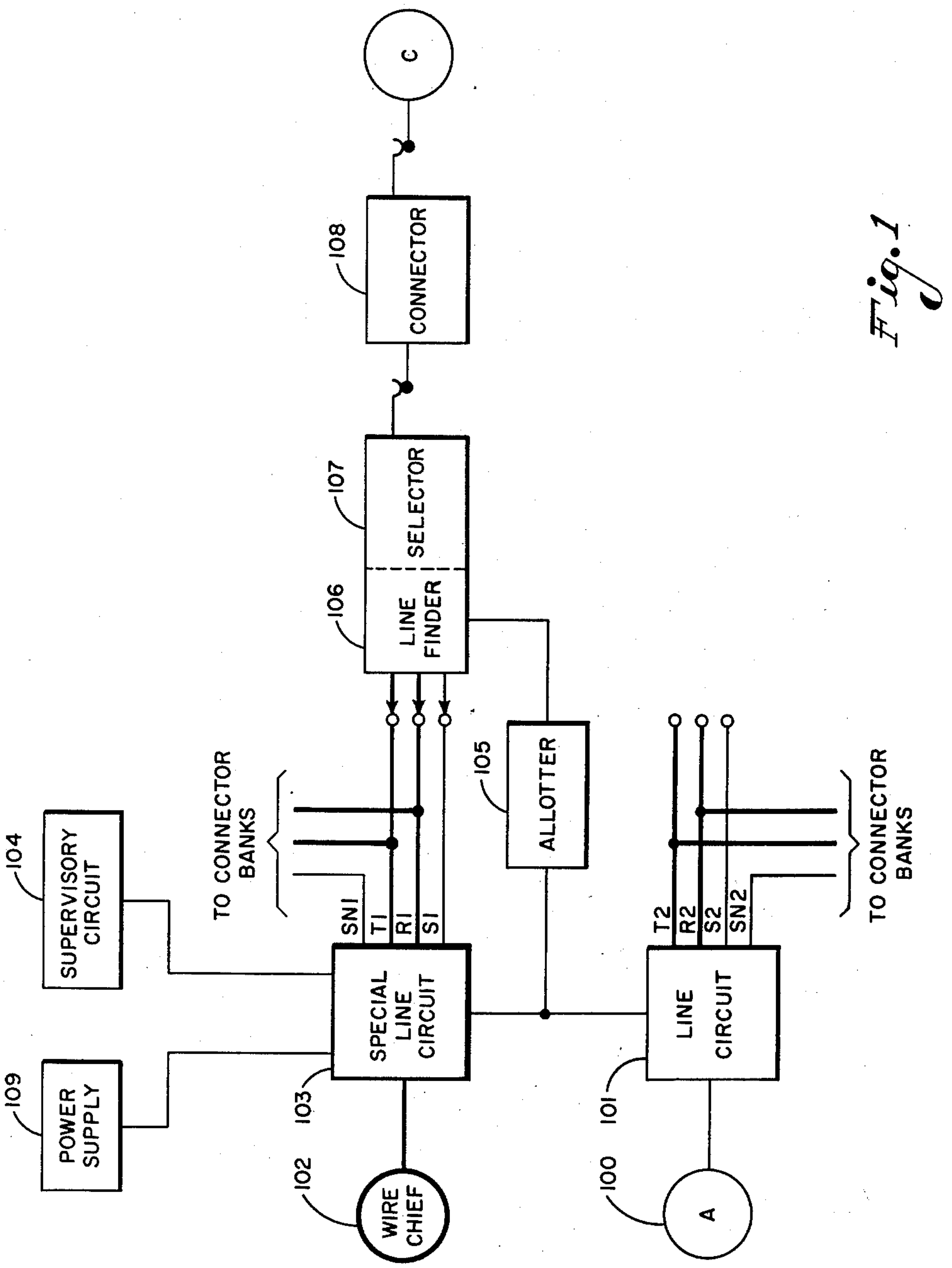

This invention relates to a telephone system and, more particularly, to means for signalling a station of a telephone exchange in response to a fault occurring in the exchange.

As is well known in the art, an unattended community dial office is usually provided with means responsive to the dialing of a special alarm checking number from any station of the exchange for providing one of a group of signals indicating whether or not a fault exists, and the type of fault, if any, which exists.

For example, in response to the dialing of the alarm checking number, if no fault exists, a two-ring ringback tone may be returned; if a permanent fault exists, such as a subscriber phone left off-hook, a one-ring ringback tone may be returned; if a non-emergency alarm condition exists, a busy tone may be returned; and if an emergency alarm condition exists, no tone may be returned. An emergency alarm condition is one in which any of the common fuses have blown, the interrupter has failed, the ringing generator has failed, low voltage exists or the finder start has failed. A non-emergency alarm is one in which individual fuses have blown, a piece of equipment fails to release, ringing or interrupter transfers, etc.

In the case of a small unattended community dial office, one man, usually the wire chief, is responsible for maintenance of the office. Therefore, it has been the practice to provide at the home and/or place of work of the wire chief of such an office, in addition to a conventional telephone subset, a special alarm responsive to any fault occurring at the unattended community dial office. This special alarm is connected to the community dial office over a subscriber telephone line which is distinct from and in addition to the subscriber telephone line connected to the telephone of the wire chief. Thus, if in the middle of the night a fault developed at the unattended community dial office, the alarm at the home of the wire chief would go off, operating a buzzer therein, waking the wire chief. The wire chief would then dial the previously described alarm checking number, and if the fault were other than an emergency alarm, he might decide to ignore it until the next morning, while if it were an emergency alarm, he would go to the unattended community dial office immediately.

Thus, it will be seen that until now in order to provide the above-described needed signalling service at the home or at the place of work of the wire chief of a small unattended community dial office, two separate subscriber telephone lines were required, one for the telephone and one for the alarm.

It is an object of this invention to provide an alarm of the type described which is incorporated in the telephone subset of the wire chief and which operates over the same subscriber line as the telephone subset.

Figure 2:
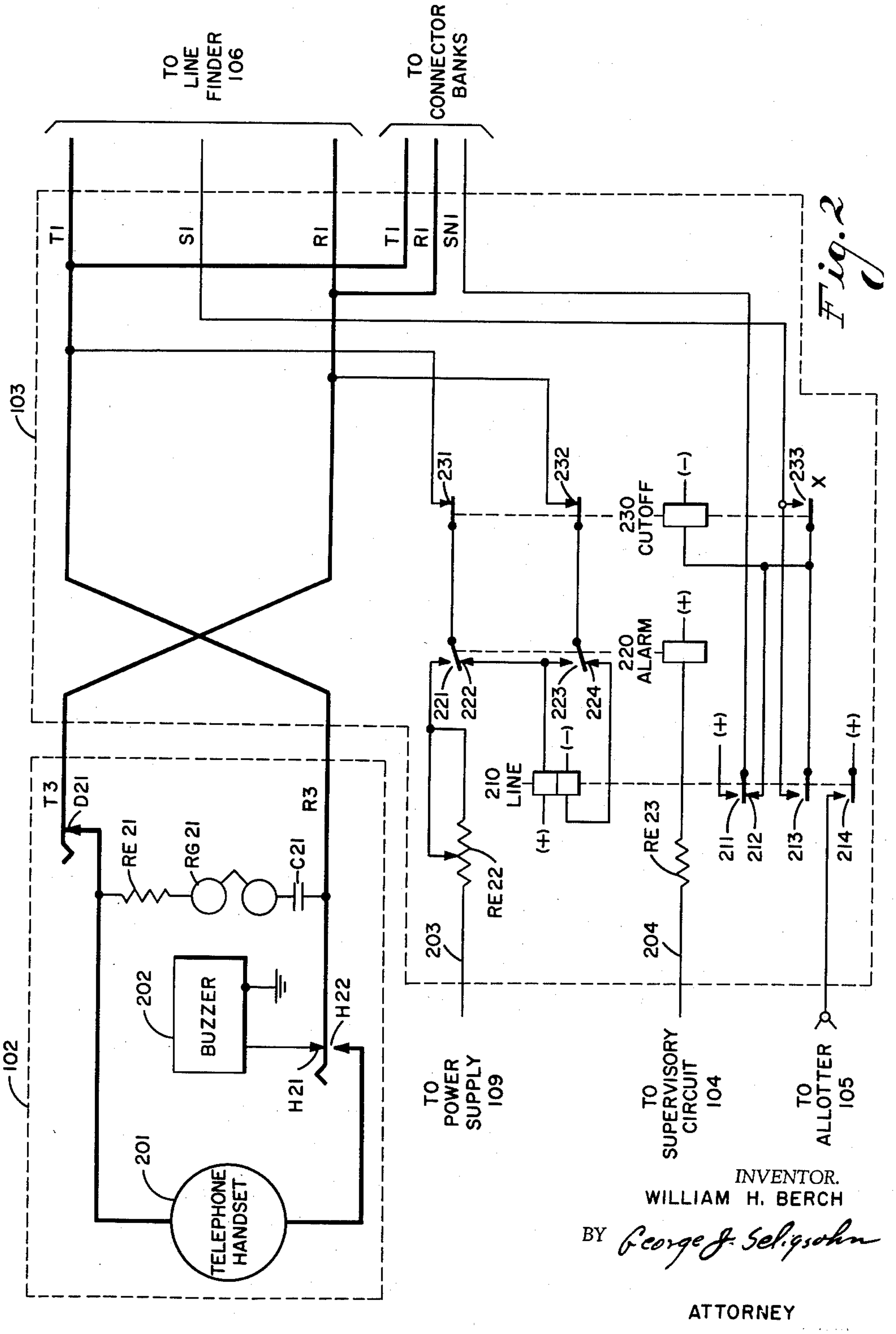

This and other objects and advantages of the present invention will become apparent from the following detailed description taken together with the accompanying drawing, in which:

FIG. 1 is a block diagram of the pertinent portions of an unattended community dial office employing the present invention, and FIG. 2 is a schematic and block diagram of the specific structure of the wire chief's station, telephone line and special line circuit of FIG. 1.

2

Referring now to FIG. 1, there is shown subset 100 of subscriber A of a small community dial exchange. Subset 100 of subscriber A is connected over a telephone line to conventional line circuit 101 at the community dial office. In response to the initiation of a call by subscriber A, a start signal is applied from line circuit 101 to allotter 105, which in turn operates line finder 106 to hunt for and find line circuit 101, to thereby extend a connection from line circuit 101 through conductors T2, R2 and S2 thereof and the wipers of line finder 106 to effect the seizure of selector 107, integral with line finder 106. This is all done in a manner well known in the art.

In response to the dialing of the directory number of a called subscriber, such as subscriber C, the wipers of selector 107 and then the wipers of a connector, such as connector 108, are operated to complete a connection between subscriber A and subscriber C.

Conductors T2, R2 and SN2 of line circuit 101 have access to connector banks to provide for incoming calls to subscriber A, all in a manner well known in the art.

In a similar manner, the wire chief may make outgoing calls from his subset 102 over special line circuit 103 and conductors T1, R1 and S1, and receive incoming calls over conductors T1, R1 and SN1.

As shown in FIG. 1, special line circuit 103 differs from conventional line circuit 101 in that the former is connected to supervisory circuit 104 and power supply 109, while the latter is not. These connections to power supply 109 and supervisory circuit 104 are needed by special line circuit 103 in order to send a special signal to subset 102 of the wire chief.

In order to more specifically describe the invention, reference will now be had to FIG. 2, which shows in greater detail the subset 102 of the wire chief and special line circuit 103.

Subset 102 consists of telephone handset 201 which has one terminal thereof connected to conductor T3 of the telephone line through dial contacts D21, and has the other terminal thereof connected to conductor R3 of the telephone line through normally open contacts H22 of the hookswitch. Connected across the telephone line, as shown, is the ringing circuit of subset 102, consisting of serially connected capacitance C21, ringer RG21 and resistance RE21.

So far as described, everything in subset 102 is conventional. However, in addition to the foregoing, subset 102 includes buzzer 202 connected between a point of reference potential and conductor R3 of the line through normally closed contacts H21 of the hookswitch.

Conductors T3 and R3 of the telephone line extend to line circuit 103 in the exchange where they are cross-connected, as shown, to conductor R1 and conductor T1, respectively.

Line circuit 103 includes line relay 210, alarm relay 220 and cutoff relay 230. Alarm relay 220 is normally maintained operated by a voltage applied thereto from supervisory circuit 104 over conductor 204 and resistance RE23. Should any fault develop in the exchange, supervisory circuit 104 responds thereto by removing this operating voltage for alarm relay 220, causing alarm relay 220 to restore.

As shown, a reference potential, ground, is normally applied to conductor R3 over a connection extending from ground through the upper winding of line relay 210, operated contacts 222, normally closed contacts 231, conductor T1 to conductor R3.

Grounded battery is normally extended to conductor T3 over a connection from grounded battery through the lower winding of line relay 210, operated contacts 224, normally closed contacts 232, conductor R1 to conductor T3.

In making a conventional outgoing call, the wire chief lifts his handset 201, operating hookswitch contacts H22, to complete a bridge through handset 201 between conductors T3 and R3. This causes the operation of line relay 210 which closes normally open contacts 211, 213 and 214 thereof and opens normally closed contacts 212 thereof. The closure of normally open contacts 214 is effective in applying ground to allotter 105. The closure of contacts 211 applies ground to conductor SN1, which marks this line as busy to the connectors having access thereto. When, as previously described, selector 107 is seized, ground is returned therefrom over conductor S1 and is extended through operated contacts 213 and cutoff relay 230 to grounded battery, to thereby effect the operation of cutoff relay 230.

The operation of cutoff relay 230 opens normally closed contacts 231 and 232 thereof and closes normally open contacts 233 thereof. The opening of contacts 231 and 232 of cutoff relay 230 breaks the previously described operating path for line relay 210, and the closure of contacts 233 thereof provides an alternate path from conductor S1 to cutoff relay 230. Therefore, when line relay 210 restores, reopening contacts 213 thereof, cutoff relay 230 remains operated over operated contacts 233 thereof.

In response to an incoming call, ringing current is applied to the previously described ringing circuit of subset 102 over a connection extending from a connector bank, conductor T1, conductor R3, capacitance C21, ringer RG21, resistance RE21, dial contacts D21, conductor T3 and conductor R1 to another connector bank. In response to answer by the wire chief, hookswitch contacts H22 are operated, providing a direct current bridge through telephone handset 201 across conductors T3 and R3, which trips ringing in the connector and provides a talking connection over conductors T1 and R1 in a well known manner.

Thus, it will be seen that so far as has been described, subset 102 together with line circuit 103 operates in a conventional manner to make and receive telephone calls.

It might be pointed out here that when alarm relay 220 is operated, buzzer 202 is deenergized, since, as previously described, ground is then applied to conductor R3 through the upper winding of line relay 210, so that when alarm relay 220 is operated, buzzer 202 has ground applied to both terminals thereof.

However, should a fault occur in the community dial office, alarm relay 220 will be deenergized, as previously described.

Therefore, alarm relay 220 will restore, causing operated contacts 222 and 224 thereof to open and normallly closed contacts 221 and 223 to close. Under these conditions, a special source of voltage from power supply 109 will be applied to conductor R3 over a connection extending from conductor 203 through resistor RE22, normally closed contacts 221 and 231 and conductor T1 to conductor R3. This voltage applied from power supply 109 is special in that it is not connected to battery through a fuse, as is generally the case, so that it will be present regardless of whether any or all of the fuses have blown or not.

This special voltage extended to conductor R3, as previously described, is further extended through normally closed contacts H21 of the hookswitch and buzzer 202 to ground, to thereby effect the operation of buzzer 202 and provide an alarm.

In response to the operation of buzzer 202, indicating a fault condition at the unattended community dial office, the wire chief will answer his phone. In response to answer, normally closed contacts H21 of the hookswitch are opened and normally open contacts H22 of the hookswitch are closed. The opening of contacts H21 of the hookswitch breaks the previously described operating path for buzzer 202, causing the alarm to cease. The closure of normally open contacts H22 provides a bridge through telephone handset 201 across conductors T1 and R1, completing a circuit extending from special battery at power supply 109 over conductor 203, resistance RE22, normally closed contacts 221 and 231, conductors T1 and R3, operated hookswitch contacts H22, handset 201, dial contacts D21, conductors T3 and R1, normally closed contacts 232 and 223, the upper winding of line relay 210 to ground. Thus, an energization path for line relay 210 is completed over its upper winding, causing line relay 210 to operate.

The operation of line relay 210 results in the seizure of selector 107 and the operation of cutoff relay 230 in the manner previously described.

The wire chief now proceeds to dial the previously described alarm checking number to determine what type of fault exists at the community dial exchange.

In addition to returning a signal indicative of the type of fault which exists at the community dial exchange, the dialing of the alarm checking number is effective in restoring voltage from supervisory circuit 104 to conductor 204 to effect the reoperation of alarm relay 220, in a manner well known in the art.

Although only a preferred embodiment of this invention has been described, it is not intended that the invention be restricted thereto, but that it be limited only by the scope of the appended claims.

What is claimed is:

1. In a telephone system, a central office having switching circuits adapted to complete connections between calling and called stations, a subscriber's station having first and second signal responsive means, a two-conductor line for connecting said subscriber's station and said signal responsive means to said central office, said first signal responsive means bridged between said two conductors and said second signal responsive means connected between one of said conductors and ground, switching circuits for selectively operating said first signal responsive means in response to the completion of a connection to said line, means responsive to certain abnormal conditions at said central office for automatically and selectively operating said second signal responsive means with power from said central office, and means for said subscriber's station to originate a connection through said switching circuits to another line after the operation of said second signal responsive means.

2. In a telephone system, a central office, a subscriber station connected to said central office by a line having first and second conductors, a line circuit including first and second relays connected to the central office end of said line, a direct current power source at said central office, first circuit means in said line circuit for connecting a reference potential from said power source through a winding on said first relay to said first conductor and for connecting a predetermined potential to said second conductor when said second relay is operated, second circuit means in said line circuit for connecting said reference potential through said winding on said first relay to said second conductor of said line and for connecting said predetermined potential to said first conductor when said second relay is not operated, and current responsive indicating means at said subscriber's station connected between said reference potential and said first conductor for responding to the flow of current over the series circuit from said power supply over said first conductor and said indicating means to said reference potential.

3. The system set forth in claim 2 and including circuit means at said subscriber station for disconnecting said indicating means from said first conductor in response to an answering operation at said station.

4. The system set forth in claim 2 and including control means for releasing said second relay only when predetermined non-standard conditions exist at said central office.

References Cited in the file of this patent

UNITED STATES PATENTS

| | | |
|---|---|---|
| 1,211,274 | Bascomb | Jan. 2, 1917 |
| 1,298,441 | Beyland | Mar. 25, 1919 |
| 1,899,112 | Saunders | Feb. 28, 1933 |
| 2,372,022 | Schneckloth | Mar. 20, 1945 |
| 2,859,285 | Hall | Nov. 4, 1958 |